April 5, 1955 C. W. GEER 2,705,765

SINGLE GUN COLOR TELEVISION RECEIVING TUBE AND SCREEN STRUCTURE

Filed April 3, 1950 2 Sheets-Sheet 1

INVENTOR:
CHARLES WILLARD GEER
BY HIS ATTORNEYS
HARRIS, KIECH, FOSTER & HARRIS
By [signature]

INVENTOR:
CHARLES WILLARD GEER
BY HIS ATTORNEYS
HARRIS, KIECH, FOSTER & HARRIS
By [signature]

United States Patent Office 2,705,765

Patented Apr. 5, 1955

2,705,765

SINGLE GUN COLOR TELEVISION RECEIVING TUBE AND SCREEN STRUCTURE

Charles Willard Geer, Long Beach, Calif.

Application April 3, 1950, Serial No. 153,572

18 Claims. (Cl. 315—21)

This invention relates to television apparatus, and specifically to screen and tube structures adapted for yielding color effects in television receiving apparatus.

A principal object of the invention is to provide a television screen by means of which color effects may be accurately rendered so that true, clear, color images will appear to the eyes of the beholder.

Another important object of the invention is to provide a television screen and associated apparatus by means of which accurate color effects may be obtained through the employment of a single electron gun which is used on a television tube carrying the screen and is operated at the frequency of the television transmitting station.

It is an additional object of the invention to provide a television screen and tube structure wherein the screen is selectively provided with a plurality of phosphors capable of activation or energization to yield different principal colors, the different phosphors for such colors being successively arranged in closely adjacent lines, or rows of spots, in alternating order to yield repeating color series, so that conductive grid elements disposed between the phosphor lines and connected in parallel in corresponding groups or series may be relied upon to attract or repel or permit passage of electron beams to the respective phosphors from an electron gun in accordance with polarities successively applied to the conductive grid elements by any known or preferred electronic switching device, whereby to excite or activate selectively at any given instant only that phosphor which corresponds with the color then being televised.

An additional object of the invention is to provide a grid and phosphor arrangement in television screens adapted for selective phosphor activation by means of selectively controlled polarities imposed on those parts of the grid work which correspond with colors being televised at the transmitting station.

It is a still further object of the invention to provide a television-receiving system in which polarities selectively applied to appropriate grid elements on a television screen act to permit impingement upon respective phosphors of only those electron beams which correspond with the particular color being televised.

Another object is to provide appropriate procedures for producing television screens of the indicated type. A specific object of this character is to provide a method for effecting a proper phosphor deposit in the manufacture of the screen which takes advantage of certain of the same polarity conditions which will exist during operation of a finished tube.

Still another important object is to provide for relatively great spaces between the grid elements on the screen whereby to produce adequate insulation between such elements and render high voltage operations feasible.

More specifically it is an object of the invention to provide in a television screen a plurality of grooves or channels, or rows of depressions, or other cavities, in the bottoms of which different phosphors are placed in predetermined order to yield corresponding principal colors upon selective activation by selective control of scanning beams. Another object is to employ grid means and to selectively control polarities thereof to attract, repel or pass, selectively, appropriate electrons from a television electron gun.

Phosphors which are appropriately excitable by electron beams to yield principal colors are well known and are described in the Leverenz Patent 2,310,863, and in the work by Zworykin and Morton entitled "Television, the Electronics of Image Transmission," 1940, published by John Wiley & Sons, Inc.

Other objects of the invention and various features thereof will become apparent to those skilled in this art upon reference to the following specification and the accompanying drawings wherein certain illustrative embodiments are disclosed.

Figure 2:
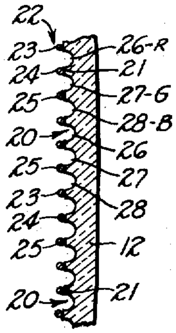
Fig. 2 is a fragmentary cross section on an enlarged scale of the screen seen at the right of Fig. 1, and showing a grid and groove arrangement.
Figure 4:
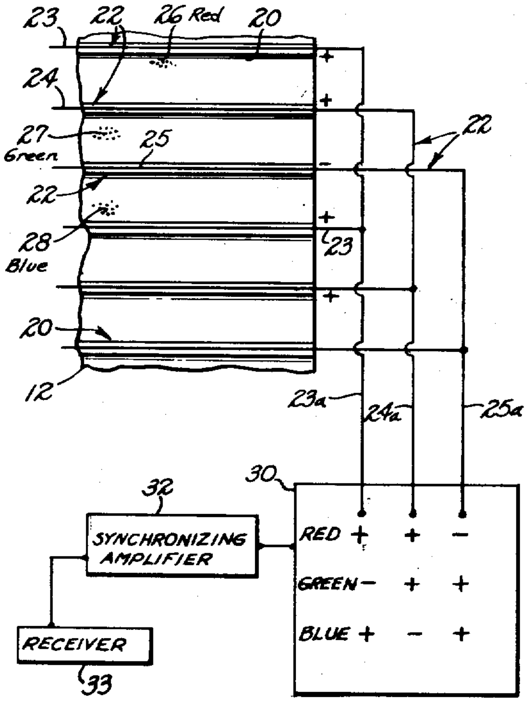
Figure 3:
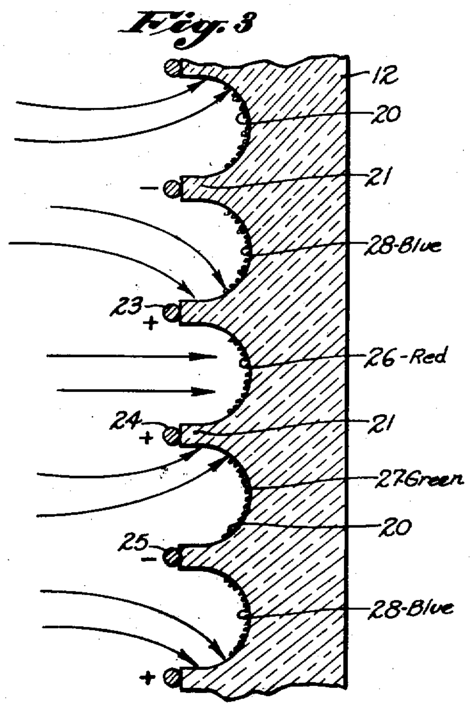
Figure 5:
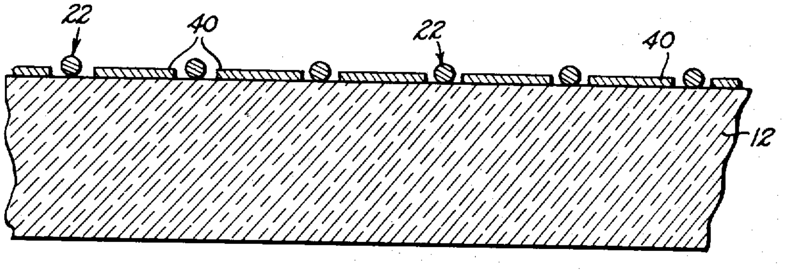
Figure 6:
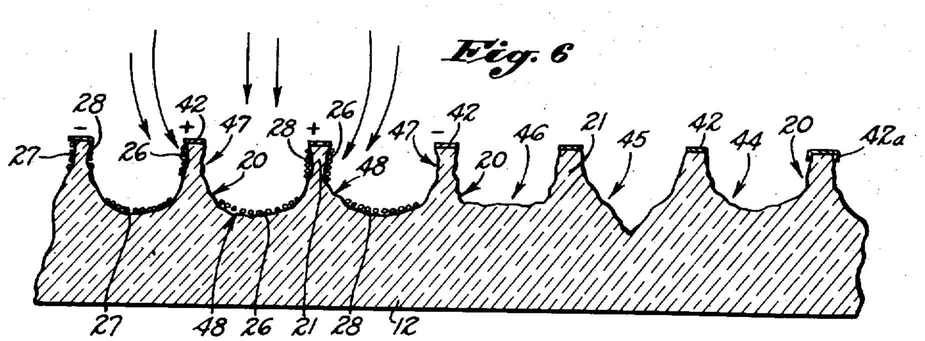
Figures 7, 8, 9, 10, 11, 12:
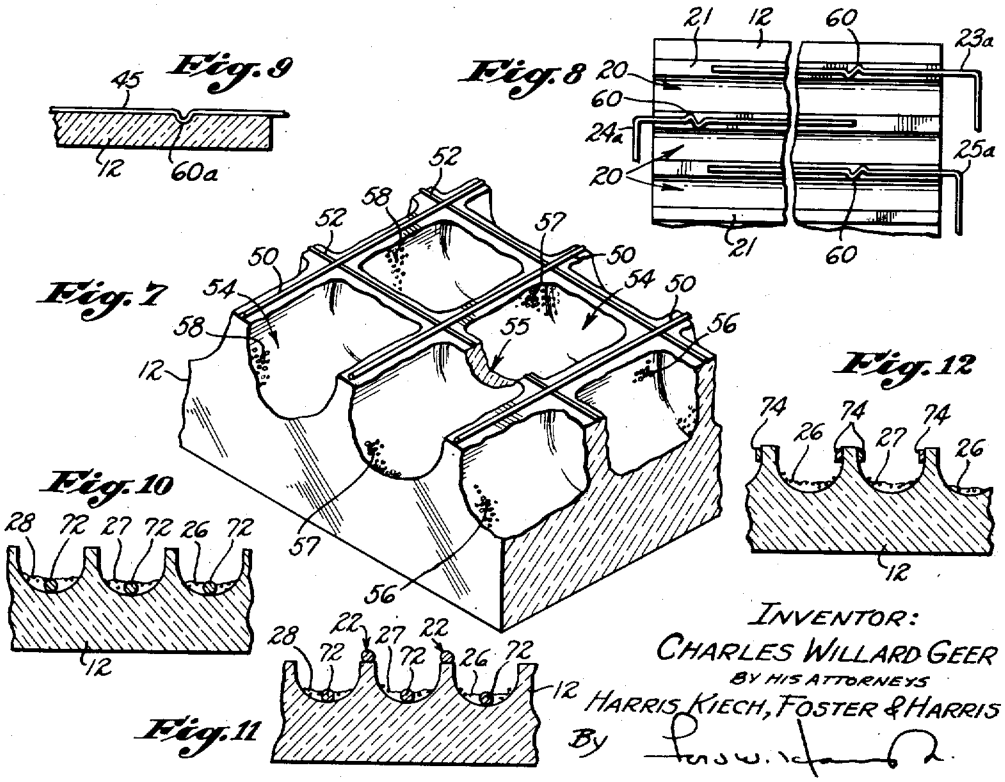

Fig. 3 is a fragmentary cross-sectional view on a larger scale than that of Fig. 2 indicating somewhat diagrammatically the relative relationships of the parts of the screen in operation and illustrating the manner in which beams from an electron scanning gun are respectively deflected and passed, so that one of the phosphors in each series of grooves is activated by the passed beams to yield one principal color, beams being deflected by attraction to or repulsion away from the other phosphors to avoid production of the other colors;

Fig. 4 is a diagrammatic plan view on an enlarged scale indicating the relationship between the various series of phosphor lines and the respective conductive wires or strips constituting grid elements provided for controlling excitation or energization of the respective phosphor series;

Figs. 5 and 6 are fragmentary views indicating other arrangements and other methods for preparing the screen and placing the required grid elements;

Fig. 7 is a fragmentary perspective view indicating a third method of production in which a woven grid structure is employed;

Figs. 8 and 9 are respectively diagrammatic plan and diagrammatic sectional details showing a grid structure for controlling inductance; and Figs. 10, 11, and 12 are fragmentary sections indicating other dispositions of grid elements.

Figure 1:
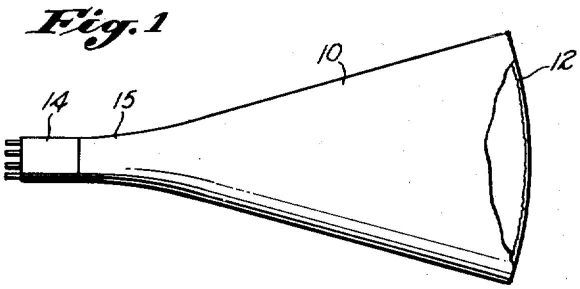
Fig. 1 is a side elevation of a television tube or bulb of the kinescope or iconoscope type equipped with improvements of this invention, a portion of the bulb wall being broken away to reveal the positioning and mounting of my improved color screen.

Fig. 1 of the drawings illustrates an evacuated glass cathode ray bulb or tube 10 of the iconoscope or kinescope type (hereinafter termed the "tube") having at its front a viewing screen 12 and provided at its opposite end with a single electron gun 14 carried on the extremity of a reducing neck 15 leading from the body of the tube 10. The screen 12 and the cross section of the tube 10 may be circular or otherwise as desired, and desirably the screen 12 may be somewhat concave internally to conform with the radius of operation of the scanning gun 14. The glass of which the screen 12 normally will be composed may be transparent or merely translucent according to requirements or preferences.

The operation of the electron gun 14 to scan the screen 12 will be under the control of means well understood in the television art, and the gun will be operated at whatever frequency is used in the scanning and analyzing equipment of the transmitting station for the purpose of color reproduction. Since such apparatus and its operation are known in the art, no further explanation and description are necessary here.

As indicated particularly in Figs. 2, 3, and 4, the inner face of the glass screen 12 is provided with a multiplicity of finely spaced channels or grooves 20 which provide between them projecting ribs or ridges 21 presenting inwardly directed plateau faces, each of which carries one of a multiplicity of electrically conductive grid elements collectively indicated at 22, and illustrated in these figures as fine wires. These wires or strands are shown as being arranged in three series respectively designated 23, 24, and 25. The various series or groups of wire 23, 24, and 25 extend to the edge of the screen as indicated in Fig. 4, and the various members of each of the three groups connect with corresponding common lead wires **23*a*, 24*a*, and 25*a***, thus connecting each group in parallel.

The members of the three series of wires 23, 24, and 25 are positioned to extend along the plateaus bordering the corresponding series of the grooves 20, and the surface area bottoms only of these series of grooves spaced from the wires are respectively supplied with adhering phosphors capable, respectively, of being activated or energized to yield, for example, red, green, and blue colors. Thus, the wires 23 parallel a series of grooves containing phosphors 26 which will produce red lines when activated, the wires 24 parallel a series of grooves containing phosphors 27 which will produce green lines, and the wires 25 parallel a series of grooves containing phosphors 28 which will produce blue lines. These phosphors 26, 27, and 28 may be known as red phosphors, green phosphors, and blue phosphors respectively, and the wires spaced from the phosphors may be referred to collectively as grid groups. With these wire arrangements, the lines of red phosphors 26 have wires 23 and 24 at the opposite sides thereof, the lines of green phosphors 27 have wires 24 and 25 at the opposite sides thereof, and the lines of blue phosphors 28 have wires 25 and 23 at the opposite sides thereof. As a consequence, by controlling the polarity of the respective grid wires, electron beams from the scanning electron gun 14 may be permitted to pass to the desired phosphors when wires at the two sides of a given groove are positively charged, as indicated for the red phosphors 26 in Fig. 3, or may be deflected to the uncoated surface area sides of the respective grooves by attraction and repulsion when the wires at the opposite sides of such grooves are oppositely charged, as indicated for the green phosphors 27 and the blue phosphors 28 in Fig. 3, in which figure electron beam travel is represented by arrows. The phosphors may be applied by settling, spraying, or other appropriate means.

The polarity to be imposed upon the respective series of grid wires 23, 24, and 25 may be produced by any appropriate electronic switching device, such as generally indicated at 30, to which appropriate frequency impulses or signals are supplied from any appropriate preferred or known synchronizing amplifier 32, connected to a conventional television receiver with which this improvement is used. It will be apparent that the frequency used is that of the transmitting system at the televising station, for example 3.8 megacycles, which has heretofore been employed for such transmission. Apparatus of this type being understood in the art and specifically not being a part of this invention, no further description is here given.

The grooves 20 may be produced in the glass screen 12 by ruling, or etching, or in any other known or preferred manner appropriate for placing them sufficiently close together for the purpose. From the etching standpoint, a series of the wires 22 may be laid along a glass surface which is to be the inner face of the screen 12, as indicated in Fig. 5, and these may be interspaced with strips of removable tape 40. By coating the wires 22 with wax, melting the wax, allowing it to harden, and then removing the tape strips, the glass surface between the wires will be exposed so that the spaces between the wires may be etched with acid to provide the required grooves 20. The wires will be appropriately cemented to the glass to anchor them in place.

Another procedure for providing electrical conductor or grid strips or strands corresponding to the wires 22 is indicated in Fig. 6 where the grooves 20 are first made by ruling or etching, and metallic conductive ribbons 42 or the like are placed on the plateaus of the ridges 21 by any appropriate form of metal deposition such as silvering with a solution of a silver compound, or deposition in vacuum, or electroplating, or other method. Thus, a conductive graphite composition, or the like, may be applied to the plateaus between the grooves 20 and copper or silver, or other appropriate metal, deposited on such conductive material electrolytically. The deposit may be readily controlled under such electrolytic conditions to provide such inductance as required. An example of a conductive graphite composition suitable for use in such connection is that currently known on the market as "Aquadag." Such a composition may be readily applied with a rubber or similar roller according to well known procedures.

Fig. 6 also is illustrative of various configurations of the grooves 20 which may result under varying conditions. Thus, it is not probable that any groove surface will be smooth and symmetrical, as indicated in Fig. 3, but probably will be relatively rough and irregular as Fig. 6 indicates. These grooves might approach a semicylindrical form as indicated at 44 on the right of Fig. 6, or be triangular as indicated at 45, or be roughly square bottomed as indicated at 46. Again, acid etching may be carried to such an extent as to undercut the plateaus (which are at the time protected by wax or similar strips) as seen in the two grooves at the left of Fig. 6. This will result in an offset portion 47 immediately underlying the respective ridge 21 or the respective ribbon 42 at the top of each side of each groove, and a lower portion 48 representing in general the bottom of the groove. Thus, each groove as a whole will have an extreme internal width exceeding the spacing between the ribbons 42 and the corresponding plateaus. This structure will provide for increased areas of activated phosphor surfaces viewable from the outer, smooth face of the screen 12. To take advantage of this particular construction the phosphors are applied after the ribbons 42 (or wires 22, if used) have been applied. During application the various ribbons 42 will be charged as by a conventional potential generator so that their polarities during the time that the phosphors are being settled are such as indicated in Fig. 6. Thus, red phosphors 26 may be deposited in the bottom surface area portion 48 of the groove bordered on both sides with ribbons 42 of positive polarities, whereas phosphors descending toward grooves bordered by ribbons of opposite polarities will be deflected to the upper undercut surface area portions 47, without reaching the bottoms 48. Of course, during the respective settling operations the polarities must be maintained as required. As a consequence, when the screen is subsequently used, the phosphors 26 in the bottom of the respective grooves and the phosphors 26 on the upper side portions of the adjacent grooves will be simultaneously activated and, as a further consequence, the area of red phosphor activation will be increased beyond that of the form illustrated in Fig. 3 where the respective phosphors lie only in the bottoms of the respective grooves. The selective application of the green and blue phosphors may be carried out in the manner above described for application of the red phosphor, the various ribbons 42 being charged so that their polarities act upon the phosphors to cause their deposit in the grooves upon their respective surface areas (see, for example, numerals 27 and 28 of Fig. 6).

In Fig. 7, there is indicated a still further procedure for appropriately providing cavities or pockets to receive phosphors and for placing electrically conductive wire grids upon ridges or plateaus at the sides of such cavities. Here, a woven fabric is employed which comprises a warp of fine metallic conductor wires 50 and a woof of fine, preferably stable, insulator threads 52, such as "nylon" threads or glass threads, the fabric having interstices of appropriate dimensions. This fabric is attached to the inner face of a sheet of glass which is to constitute the screen 12, the strands 50 and 52 being appropriately waxed and the wax melted sufficiently to protect the immediately adjacent glass surface lines as required. Thereupon, the exposed portions of the glass face are etched with acid to leave a multiplicity of pockets 54. If desired, the woof threads 52 could be formed of material removable with the etching acid or other agent after securing of the wire strands 50, in which case parts of the corresponding pocket walls also might be etched away as indicated at 55. Subsequently, the surface area bottoms and the surface area sides of these pockets are appropriately coated with phosphors, to yield red, green, and blue colors, as indicated at 56, 57, and 58 to correspond with the locations of the phosphors 26, 27, and 28 of the other forms. Thus, lines or rows of pockets 54 are formed between the metallic conductor wires 50 to receive the respective phosphors and, in effect, provide for corresponding color lines.

With respect to the spacing of the grooves 20 and of the lines of pockets 54, the spacing will be sufficiently small for the production of adequate fineness of detail as the televised image is being viewed from any appropriate distance. Ordinarily, the spacing will be such that the combined width of one group of color lines will be encompassed by the scanning beam; for example, the total width of one line series of the three indicated colors red, green, and blue may correspond with a standard black-and-white line width for a given scanning beam. With respect to the metallic conductor grid strands, the wires 22 and 50 may be in the form of a series of turns, or they may be straight wires. Preferably, they should have enough inductance to offset the capacitance effects. Similarly, when the metallic, or equivalent, ribbons 42 are used, they also should have enough inductance to equal capacitance.

Depending upon the spacing between the grooves 20, the grid strands, whether they be wires 22 or metallic ribbons 42, will have capacitive effects which may be consequential, and accordingly it would be desirable under such circumstances to offset or balance out the effects by introducing appropriate inductive effects in the structure. By predetermining the spacing of the grids, the capacitive effects may be determined, as well as mutual inductance between the grids. Additional inductance may be introduced where required by providing appropriate turns or crooks, or a series thereof, in the grid strands as illustrated in Figs. 8 and 9. Preferably these turns will be near the juncture points of the strands with the lead lines 23*a*, 24*a*, and 25*a*, so as not to interfere with the symmetry of the screen 12. These crooks for the three wires or ribbons 42 of each color series are indicated at 60, and they may be arranged with respect to the ends of the ribbons as illustrated in Fig. 8 where they are in the form of waves on the plateaus at the sides of the grooves 20. However, they would be equally effective if disposed vertically with respect to the surface of the screen 12 by employing depressions therein as indicated at 60*a* in Fig. 9. The size and shape of these crooks or waves, or equivalent arrangement, are determinative of the inductance in such a structure. With the frequency of operation known, inductive reactance may be made substantially equal to the capacitive reactance. It may be desirable not to have the reactances equal, and accordingly it is contemplated that the differences may be determined by variation in spacings and in introduced inductances. With respect to the metallic ribbons 42, they may be applied so as to cover the plateau as well as to extend somewhat down the sides of the grooves if required, as indicated at 42*a* at the right of Fig. 6. In such a manner the capacitive effects may be predetermined. Thus, there is provided a method to control both the capacitive and the inductive effects.

In operation with the screen and system of this invention, the frequency employed to control the polarities of the grid elements 23, 24, and 25 will correspond with that of the transmitting apparatus at the televising station where, as previously indicated, the transmitting signals are produced by known means for operation with a single receiving gun. In connection with the passage of the signals to the scanning electron gun 14 of the television tube of this invention, the electronic switching device 30 and synchronizing amplifier 32 serve to change the polarities on the grids as scanning proceeds, so that positive charges in grids at opposite sides of given phosphor lines in one series are alternately and successively shifted to the grids of the other series. Thus, as indicated in Fig. 3, in one scanning stage positive charges will exist in the conductor wires 23 and 24 at opposite sides of the red phosphor lines 26, and this condition will permit passage of the corresponding electrons from the scanning gun 14 to the red phosphors to excite the latter. Under these conditions the existence of a positive charge in the conductor 24 at one side of each green line 27 and a negative charge in the conductor 25 at the other side of each green line 27 will result in deflecting the corresponding electrons toward the positively charged conductor 24, so that they strike the adjacent side wall or surface area of the respective groove 20 above the green phosphor line 27 and prevent activation of the green phosphor. Similarly, the electrons approaching the blue phosphor line 28 will be deflected and prevent activation thereof. At the next scanning stage, the electronic switching device 30 changes the polarities so that the two positive charges are imposed upon the conductors at the opposite sides of each green phosphor line 27 to permit the green phosphor to be activated, the red phosphor becoming deactivated by reason of the presence of a negative charge at one side of the respective line, and the blue phosphor remaining deactivated for the same reason. In the following scanning stage the blue phosphor line 28 becomes activated, the red and green phosphor lines being deactivated.

This system for producing color reproduction in color television tubes has the advantages that it greatly lowers grid voltages, greatly lowers the capacitance which is of much importance for high frequencies, and, due to the spacing of the conductive grid strands 22, 42, and 50, provides adequate insulation. With the structure disclosed, the insulation effects resulting from the spacings between the grid elements are substantial and permit high voltages to be applied to the grids, a condition which is most desirable in view of the high velocity of the electrons flowing from the electron gun, and in view of prospective velocity increases.

As indicated in Fig. 10, the ridges 21 may act to provide additional insulation effects by placing grid elements 72 (similar to the grid elements 22) in the bottoms of the grooves 20 where they may be covered with the respective phosphors. With such a construction, each grid whose phosphors are to be activated will receive a positive polarity charge, while the grids for the other phosphors will simultaneously receive a negative charge. Under these conditions, the ridges 21 afford high insulation effects.

As indicated in Fig. 11, it may be feasible to employ both grid elements 22 on the plateaus of the ridges 21 and grid elements 72 in the bottoms of the grooves 20, the polarities being controlled as required and attraction and repulsion effects being enhanced by the employment of both sets of grid elements.

It may be feasible also, for some uses at least, to place grid elements 74 on the sides of the grooves 20 near the tops of the ridges 21 as indicated in Fig. 12. These may be arranged in pairs to receive like polarities, or singly, both being indicated.

For the purpose of outlining this invention with specific relationship to certain presently commercial practices wherein a screen is traversed by a beam of electrons in predetermined synchronism with a transmitter by means of horizontal and vertical deflection coils and wherein a scanning rate of 525 horizontal lines each 1/30 of a second is employed, there may be similarly employed with this system 525 horizontal line series, each of which line series contains a red phosphor line, a green phosphor line, and a blue phosphor line, with respective intervening grid series 23, 24, and 25. Employment of the standard scanning rate gives rise to a fundamental rate of 30 frames per second. By the so-called interlaced scanning, an effective rate of 60 frames per second is obtained, each scan averaging 262½ lines. It is assumed that the transmitter at the televising station sends a carrier that is alternately modulated with video signals in a sequence corresponding to the trichromatic system of colors of this invention, whereby each effective frame is scanned by a beam of electrons corresponding to a single primary color. Therefore, when a red scan is functioning, the grids on the screen 12 will have applied thereto polarities permitting the beam of electrons to activate only the red phosphors 26.

Thus, the grids 23 and 24 on the plateaus at opposite sides of each line of red phosphors 26 will carry a positive potential, the field between them being receptive to the electrons and permitting them to pass directly through to the red phosphors and activate them to yield a red color. The other grid, namely the grid 25, at each location, will carry a negative potential during the red scan and create a field to repulse or deflect the electrons that would otherwise activate the green phosphor line 27 and the blue phosphor line 28. On the next scan, with the color arrangement illustrated, a green color will be obtained by activation of the green phosphor line 27 in the same manner, by reason of the polarity changes effected by the electronic switching device 30 and the synchronizer 32. Similarly, a blue color will be obtained by activation of the blue phosphor line 28 on the next succeeding scan.

Therefore, assuming a normal 1/60 of a second interval for each frame, the connections to the grids will be alternately changed each 1/60 of a second. Under these conditions, a signal from the vertical saw generator 32 of the television receiving set (or other device which determines the rate of framing) is applied to the switching device 30, so that this signal synchronizes the polarity changes in the grids with the vertical framing field frequency. Hence, at each 1/60 of a second, or each complete vertical scan, there will be provided one of the primary colors. In plural color television by this invention, these frequencies may be higher than in present commercial monocolor production. Persistence of phosphorescence for three scans will be adequate to yield, by an additive process, the required color effects in the human eye. It is contemplated that a system of transmission may be adopted whereby the color scan is changed for each individual horizontal line scanned rather than for each effective frame. The present structure may accommodate such a system by utilizing a signal from the horizontal saw generator (or other device which determines the rate of line scanning) and applying such signal to the electronic switching device 30 from the synchronizing amplifier 32, if needed. Hence for each horizontal line scanned, there will be provided one of the principal colors. It will be understood that the colors red, green, and blue mentioned herein are merely representative, that other colors may be selected as desired, and that more than three colors might be used.

It is intended to cover all such modifications of the generic invention herein disclosed as fall within the scope of the patent claims.

I claim as my invention:

1. A color television screen structure comprising: a screen member provided with a multiplicity of cavities having ridges therebetween; a multiplicity of adjacent lines of different phosphors carried by said screen member in the bottom of said cavities, said phosphors being capable of electron activation to yield different corresponding colors, the different phosphors being alternately disposed in successively repeating color patterns; and a multiplicity of grids adapted to carry changing polarities, said grids being disposed on said ridges adjacent to said cavities, and being connected in parallel in repeating patterns corresponding with said repeating color patterns, whereby proper polarities on the respective grids may deflect electron beams away from said phosphors in the bottom of said cavities.

2. Television color projection apparatus comprising in combination: a television tube; a single electron gun at one end of said tube to be operated in response to various signals corresponding with different colors; a screen member at the other end of said tube in position to be scanned by said gun, said screen member being provided with a multiplicity of parallel cavities being separated by ridges; a multiplicity of lines of different phosphors which are electron-excitable to yield different colors and are carried by said screen member in the bottom of said cavities in repeating, alternating color patterns yielding a multiplicity of line series each of which contains a line of each phosphor; a multiplicity of electrically conductive grid elements arranged parallel to said lines of phosphors and carried upon the tops of said ridges and electrically connected in parallel in groups corresponding with said line series, the members of each grid troup alternating with the individual phosphor lines of the respective line series; and a switching device connected with the respective grid groups to change selectively the polarities of the respective grid elements.

3. A combination as in claim 2 wherein the side of said cavities are free from phosphors so that phosphor-excitation by deflected electrons is avoided.

4. A combination as in claim 2 wherein respective phosphors are applied to the bottoms only of the respective cavities, and different phosphors, corresponding with those of adjacent cavities, are provided at the tops of the side walls of said respective cavities for activation by deflected electrons.

5. A color screen structure comprising: a screen member provided with a multiplicity of channels; a multiplicity of lines of different phosphors which are electron-excitable to yield different colors and are carried by said screen member and in said channels in repeating, alternating color patterns yielding a multiplicity of line series each of which contains a line of each phosphor; and a multiplicity of electrically conductive grid elements arranged between lines and connected in parallel in groups corresponding with said line series, the members of each grid group alternating with the individual phosphor lines of the respective line series.

6. A structure as in claim 5 wherein the sides of said channels are free from said phosphors to avoid phosphor-excitation by electrons deflected by unlike polarities on adjacent grid elements.

7. A color screen structure comprising: a screen member provided with a multiplicity of channels; a multiplicity of first lines of different phosphors which are electron-excitable to yield different colors and are carried by said screen member and in the bottom of said channels in repeating, alternating color patterns yielding a multiplicity of line series each of which contains a line of each phosphor; a multiplicity of second lines of different phosphors corresponding with those of adjacent channels provided on the upper portions of the side walls of each channel; and a multiplicity of electrically conductive grid elements arranged between said first lines and connected in parallel in groups corresponding with said line series, the members of each grid group alternating with the individual phosphor lines of the respective line series.

8. A television screen structure comprising: a screen member having a multiplicity of channels in one face thereof, said channels having an enlarged portion in the side walls thereof in indented relief; a plurality of first phosphors which are electron-excitable to yield different colors and are disposed in alternating, repeating order in the bottom of said channels to yield successive multi-color-line series; a plurality of second phosphors corresponding with those of adjacent channels provided within the enlarged portions of the respective side walls; and a multiplicity of spaced, electrically conductive grids disposed on said screen member in parallel relationship with respect to said channels and electrically connected in parallel in alternating order to provide grid series corresponding with said multi-color-line series, whereby imposition of different polarities upon the different grids provides for selective passage or deflection of beams of electrons for selective excitation of like phosphors.

9. A television screen structure as in claim 8 wherein ridges are provided between said channels, and said grids lie upon the tops of certain of said ridges beyond said phosphors to deflect electrons toward and away from like phosphors selectively.

10. A television screen structure comprising: a screen member having a multiplicity of channels in one face thereof; a plurality of phosphors which are electron-excitable to yield different colors and are disposed in alternating, repeating order in said channels to yield successive multi-color-line series; and a multiplicity of spaced, electrically conductive grids disposed upon the upper portions of the side walls of said channels and in parallel relationship with respect to said phosphors, said grids being electrically connected in parallel in alternating order to provide grid series corresponding with a multi-color-line series of said different phosphors, whereby imposition of different polarities upon the different grids provides for selective passage or deflection of beams of electrons for selective excitation of said phosphors.

11. A color screen structure comprising: a screen member having a multiplicity of channels on one face thereof and providing barriers therebetween; a plurality of phosphors which are electron-excitable to yield different colors and are disposed in alternating, repeating order in said channels to yield successive multi-color-line series; a plurality of electrically conductive first grids disposed in said channels and electrically connected in parallel alternating order to provide a grid series corresponding with said multi-color-line series of said different phosphors; and a multiplicity of electrically conductive second grids disposed upon said barriers in parallel relationship with respect to said channels and electrically connected in parallel in alternating order to provide a second grid series corresponding with said multi-color-line series of said different phosphors, whereby imposition of different polarities upon the different grids provides for selective passage or deflection of beams of electrons for selective excitation of said phosphors.

12. A television screen structure comprising: a screen member having a multiplicity of cavities in one face thereof; a plurality of phosphors which are electron-excitable to yield different colors and are disposed in alternating repeating order in said cavities to yield successive multi-color-line series, given phosphors being applied only to the bottoms of the respective cavities; and a multiplicity of spaced, electrically conductive grids disposed on said screen member in parallel relationship with respect to said cavities and electrically connected in parallel in alternating order to provide grid series corresponding with the multi-color-line series of said different phosphors, certain of said electrons which are deflected to the sides of such cavities wherein said given phosphors are applied only to the bottoms of the respective cavities failing to energize corresponding phosphors, whereby imposition of different polarities upon the different grids provides for selective passage or deflection of beams of electrons for selective excitation of said phosphors.

13. A combination comprising: a television tube; and a single electron gun carried by said tube, said tube having the screen structure of claim 12 in scanning position with respect to said gun.

14. A television combination comprising: a television tube having the screen structure of claim 12 and a single electron gun directed to scan said screen structure; and an electronic switching device connected with said grid series to change selectively the polarities on the respective grids.

15. A combination as in claim 14 including a synchronizing device connected to said switching device to synchronize polarity changes with a television transmitting apparatus.

16. A television screen structure comprising: a screen member having a multiplicity of cavities in one face thereof providing ridges therebetween; a plurality of phosphors which are electron-excitable to yield different colors and are disposed in alternating repeating order in said cavities to yield successive multi-color-line series; and a multiplicity of spaced, electrically conductive grids disposed on said screen member in parallel relationship with respect to said cavities and electrically connected in parallel in alternating order to provide grid series corresponding with the multi-color-line series of said different phosphors, said grids lying upon the tops of certain of said ridges beyond said phosphors, whereby imposition of different polarities upon the different grids provides for selective passage or deflection of beams of electrons for selective excitation of said phosphors.

17 A television screen structure comprising: a screen member having a multiplicity of grooves in one face thereof; a plurality of phosphors which are electron-excitable to yield different colors and are disposed in alternating repeating order in said grooves to yield successive multi-color-line series; and a multiplicity of spaced, electrically conductive grids disposed in the bottoms of said grooves and electrically connected in parallel in alternating order to provide grid series corresponding with the multi-color-line series of said different phosphors, whereby imposition of different polarities upon the different grids provides for selective passage or deflection of beams of electrons for selective excitation of said phosphors.

18. A television screen structure comprising: a screen member having a multiplicity of grooves in one face thereof, said grooves having ridges between them; a plurality of phosphors which are electron-excitable to yield different colors and are disposed in alternating repeating order in said grooves to yield successive multi-color-line series; and a multiplicity of spaced, electrically conductive grids disposed on said screen member both in said grooves and on said ridges and in parallel relationship with respect to said grooves and electrically connected in parallel in alternating order to provide grid series corresponding with the multi-color-line series of said different phosphors, whereby imposition of different polarities upon the different grids provides for selective passage or deflection of beams of electrons for selective excitation of said phosphors.

References Cited in the file of this patent

UNITED STATES PATENTS

| | | |
|---|---|---|
| 1,177,326 | Hewitt | Mar. 28, 1916 |
| 2,307,188 | Bedford | Jan. 5, 1943 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,458,291 | Munster et al. | Jan. 4, 1949 |
| 2,481,839 | Goldsmith | Sept. 13, 1949 |
| 2,490,812 | Huffman | Dec. 13, 1949 |
| 2,517,430 | Hensel | Aug. 1, 1950 |
| 2,529,485 | Chew | Nov. 14, 1950 |
| 2,543,477 | Sziklai et al. | Feb. 27, 1951 |
| 2,568,448 | Hansen | Sept. 18, 1951 |
| 2,605,434 | Homrighous | July 29, 1952 |